(12) United States Patent
Mogamiya

(10) Patent No.: US 7,202,999 B2
(45) Date of Patent: Apr. 10, 2007

(54) ELECTRONIC BINOCULARS

(75) Inventor: Makoto Mogamiya, Tokyo (JP)

(73) Assignee: PENTAX Corporation, Tokyo (JP)

( * ) Notice: Subject to any disclaimer, the term of this patent is extended or adjusted under 35 U.S.C. 154(b) by 106 days.

(21) Appl. No.: 10/851,292

(22) Filed: May 24, 2004

(65) Prior Publication Data
US 2004/0246576 A1 Dec. 9, 2004

(30) Foreign Application Priority Data
Jun. 6, 2003 (JP) ............... 2003-161741

(51) Int. Cl.
G02B 23/00 (2006.01)
(52) U.S. Cl. .................... 359/407
(58) Field of Classification Search ............. 359/407
See application file for complete search history.

(56) References Cited

U.S. PATENT DOCUMENTS 5,581,399 A * 12/1996 Abe .................. 359/410

2001/0028498 A1 10/2001 Haga et al.

FOREIGN PATENT DOCUMENTS

| JP | 2624556 | 4/1997 |
|---|---|---|
| JP | 2001-281555 | 10/2001 |
| JP | 2001-333312 | 11/2001 |

* cited by examiner

Primary Examiner—Drew A. Dunn
Assistant Examiner—Joshua L. Pritchett
(74) Attorney, Agent, or Firm—Greenblum & Bernstein, P.L.C.

(57) ABSTRACT

Electronic binoculars include an imaging unit, a first binocular unit, a second binocular unit, and a mode selector. The imaging unit captures an image of an object. The first binocular unit includes a first ocular unit through which the object is observed based on signals from the imaging unit. The second binocular unit includes a second ocular unit through which the object is observed based on signals from the imaging unit. The mode selector selects at least one of first and second modes. The first mode fully supplies electricity to each of the first and second binocular units. The second mode at least partially suspends the electricity supply to the second binocular unit.

8 Claims, 19 Drawing Sheets

ELECTRONIC BINOCULARS

BACKGROUND OF THE INVENTION

1. Field of the Invention

The present invention relates to electronic binoculars, in particular, to electric improved energy-saving electronic binoculars.

2. Description of the Related Art

Electronic binoculars are proposed that are capable of recording image data in a storage medium and further having the advantage of night vision. The electronic binoculars are generally provided with an objective optical system, an imaging device, an image-signal processing unit, and an ocular unit. The imaging device converts an optical image produced by the objective optical system to electric signals. The image-signal processing unit generates image signals from the electric signals which are detected by the imaging device, so that the object image can be visually indicated by the ocular unit. The ocular unit has an image-indicating device that displays the object image due to the image signals generated by the image-signal processing unit.

An imaging device, such as a CCD, as well as an image-indicating device, such as an LCD, consume electricity. Further, the image-signal processing unit that converts the electric signals from the imaging device to image signals, in order to visually indicate the object image on the ocular unit or to store the image signals in the storing medium, also consumes electricity. Therefore, such electronic binoculars are not suitable for extended use from the aspect of electricity consumption.

Japanese unexamined patent publication (KOKAI) No. 2001-281555 discloses electronic binoculars provided with an imaging device for electronic imaging; in addition to and separate from a binocular optical system, which has a pair of observation optical systems, including objective lens and ocular lens systems, as is known in the art. According to the above-disclosed binoculars, although the imaging device for capturing an object image and the ocular unit consume electricity, object images can be observed without consuming electricity through the conventional binocular optical system which is separately provided in the binoculars.

SUMMARY OF THE INVENTION

However, the structure of the above-discussed conventional electronic binoculars is cumbersome and complicated, since the electronic binocular systems are provided in addition to the conventional binocular optical system.

Therefore, an object of the present invention is to provide binoculars that can reduce electric energy consumption without reducing the advantages of the electronic binoculars.

According to the present invention, electronic binoculars are provided that comprise an imaging unit, a first binocular unit, a second binocular unit, and a mode selector.

The imaging unit captures an image of an object. The first binocular unit comprises a first ocular unit through which the object is observed based on signals from the imaging unit. The second binocular unit comprises a second ocular unit through which the object is observed based on signals from the imaging unit. The mode selector selects at least one of first and second modes. The first mode fully supplies electricity to each of the first and second binocular units. The second mode at least partially suspends the electricity supply to the second binocular unit.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
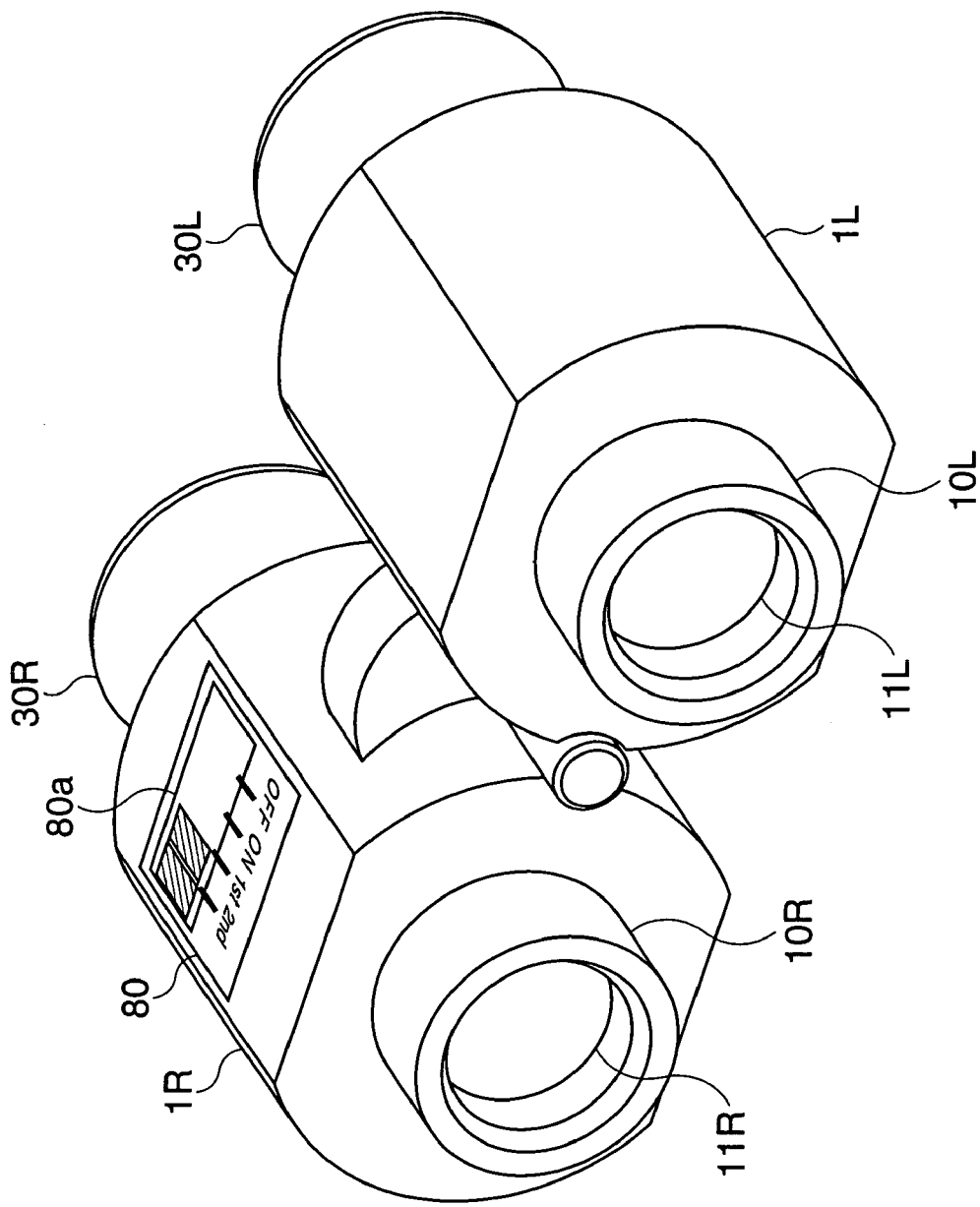
FIG. 1 is a perspective view of electronic binoculars in the first embodiment viewed from the objective lens side.
Figure 2:
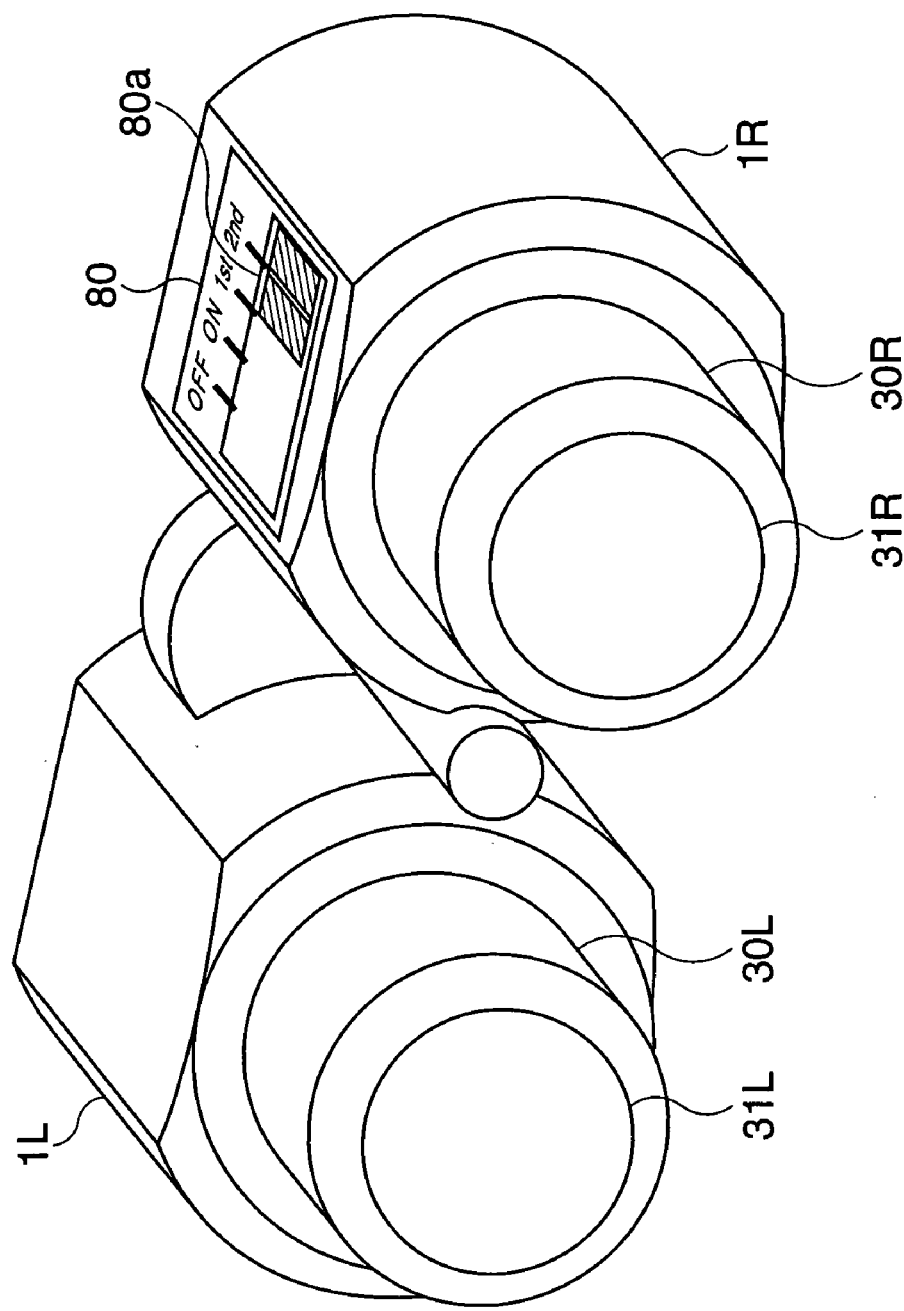
FIG. 2 is a perspective view of the electronic binoculars in the first embodiment viewed from the ocular lens side.

The present invention is described below with reference to the embodiments shown in the drawings.

As shown in FIGS. 1 to 8, electronic binoculars relating to the first embodiment are provided with an electric power source 90, right and left binocular units 1R and 1L, a controller 70, and a switch 80. Both the right and left binocular units 1R and 1L have the same constructions. Namely, the right and left binocular units 1R and 1L include imaging units 10R and 10L, ocular units 30R and 30L, and image-signal processing units 50R and 50L, respectively. The right and left binocular units 1R and 1L are connected together via a connecting mechanism so that the distance between the optical axes of the respective optical systems is adjusted.

The right imaging unit 10R is provided with an objective lens system 11R, a filter system including an infrared cut-off filter, an optical low-pass filter, and the like, and an imaging device 13R, such as a CCD. The imaging device 13R converts an optical image that is magnified through the objective lens system 11R and the filter system 12R, and which is projected onto the imaging device 13R, to electric signals. The right imaging unit 10R may include a focusing mechanism, which is not depicted in the figures. Similarly, the left imaging unit 10L is provided with an objective lens system 11L, a filter system 12L, and an imaging device 13L.

The right ocular unit 30R includes an image-indicating device, such as an LCD, and an ocular lens system 31R. The image-indicating device displays an image corresponding to image signals fed from the controller 70. Namely, an observer observes the image displayed on the image-indicating device through the ocular lens system 31R. Similarly, the left ocular unit 30L includes an image-indicating device 33L and an ocular lens system 31L.

A right image-signal processing unit 50R (a first image-signal processing unit) includes an imaging device driver 51R, a correlated double sampling circuit (CDS) 52R, a timing generator (TG) 53R, a digital signal processor (DSP) 54R, an auto-gain controller (AGC) 55R, and an analog-digital converter (ADC). Namely, the electric signals generated in the right imaging unit 10R from a captured image are converted to image signals which can be displayed and observed by the right ocular unit 30R. Further, the right image-signal processing unit 50R may include a function that converts the electric signals to image signals (for example, compressed image signals) for recording the image signals in an external storing medium. The same is true with the left image-signal processing unit 50L (a second image-signal processing unit). Namely, the left image-signal processing unit 50L includes an image-indicating driver 51L, a correlated double sampling circuit 52L, a timing generator 53L, a digital signal processor 54L, and an analog-digital converter 56L.

The controller 70 is a microcomputer that integrally controls the processes among the components in the right and left binocular units. For example, the controller 70 includes a function for feeding image signals generated by both the right and left image-signal processing units 50R and 50L to the respective ocular units 30R and 30L, and a function for controlling electric power supply from the electric power source 90 to each of the components.

Further, the controller 70 has a function for controlling the electric supply to the left imaging unit 10L, the left image-signal processing unit 50L, and the left ocular unit 30L, and also a function for controlling the image signal supply to the left ocular unit 30L, in accordance with the state of the switch 80, i.e., which contact/s is/are connected among all the contacts in the switch.

Figure 8:
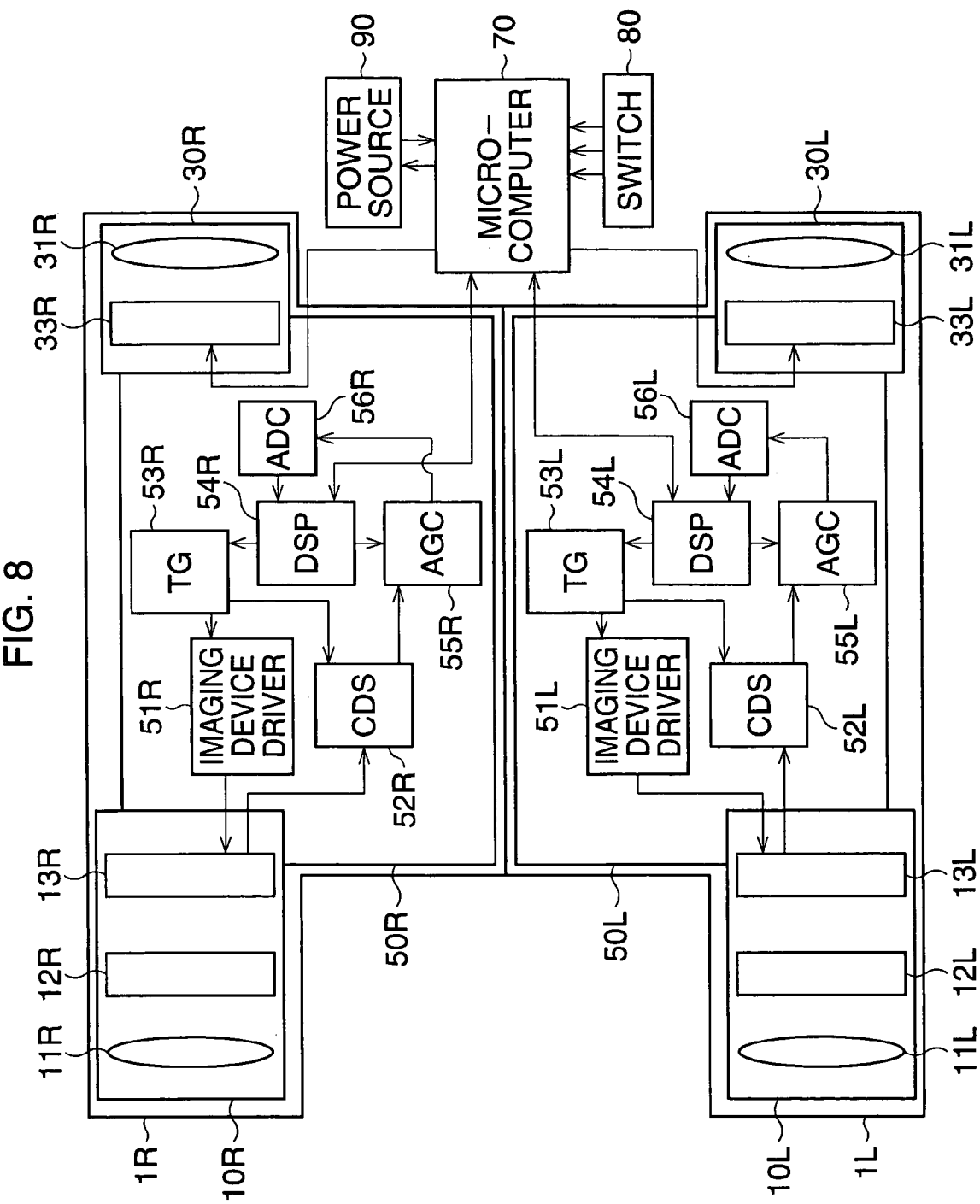
FIG. 8 is a block diagram of the electronic binoculars of the first embodiment, which schematically depicts the state of the normal mode.

Switch 80 has a manual slidable operational member 80a and switch contacts that are selected in accordance with the positions of the operational member 80a for enabling a user to select one of modes by operating the operational member 80a, to define units or components to which the electricity is supplied from the power source 90. FIGS. 3 to 6 indicate the details of the operational member 80a. As shown in FIGS. 3 to 6, the switch 80 has three selective modes, that is, a normal mode and first and second energy saving modes. Note that, in FIGS. 1 and 2, the normal mode, and the first and second energy-saving modes are represented by or abbreviated to "ON", "1st", and "2nd", respectively, for convenience. When the user slides or operates the operational member 80a from the power-off position (see FIG. 3) to the position corresponding to the normal mode (see FIG. 4), that is, turning on the power and selecting the normal mode, a normal-mode contact of the switch 80 that designates the electricity to be supplied to all components is switched to the ON state while other contacts are suspended in the OFF state. Thereby, the controller 70 detects this ON state and verifies the selection of the normal mode (see FIG. 7). In this case, the electricity is supplied to all components of the electronic binoculars, that is, to both of the right and left imaging units 10R and 10L, both of the right and left ocular units 30R and 30L, both of the image-signal processing units 50R and 50L, and the controller 70. FIG. 8 schematically illustrates the state when the electricity is supplied to all of the components of the electronic binoculars, where all of the components to which the electricity is supplied are depicted by solid lines.

Next, operations of each component will be explained, when the electricity is supplied to each of the components from the power source 90 by the controller 70.

Optical object images obtained through the right objective lens system 11R and the right filter system are projected on the light receiving area of the right imaging device 13R, and are then subjected to photoelectrical conversion, so that the electric signals corresponding to electric charge accumulated during a predetermined period in the right imaging device 13R, are generated. The value of the electric charge accumulation period is controlled by the right imaging device driver 51R.

The noise components of the electric signals which are obtained by the photoelectrical conversion are reduced by the right correlated double sampling circuit 52R. Further, the gain of the electric signals is controlled by the right auto-gain controller 55R. The electric signals are then converted to digital signals by the right analog-digital converter 56R. These operations are carried out in accordance with clock pulse signals fed from the right timing generator 53R to the right imaging device driver 51R and the right correlated double sampling circuit 52R.

The converted digital signals (or digital image signals) are subjected to image processes, such as a gamma correction process and so on, in the right digital signal processor 54R.

The image signals which were subjected to the image processes, in other words, the image signals which were processed in the right image-signals processing unit 50R, are supplied to the right image-indicating device 33R provided in the right ocular unit 30R by the controller 70.

The right image-indicating device 33R displays the image corresponding to the image signals, so that the observer can observe the image by one's right eye via the right ocular lens system 31R.

At the same time, the same operations are carried out in the left binocular unit 1L, so that optical object images being captured by the left imaging device are displayed on the left image-indicating device and the images can be observed by the left eye of the observer.

Figure 9:
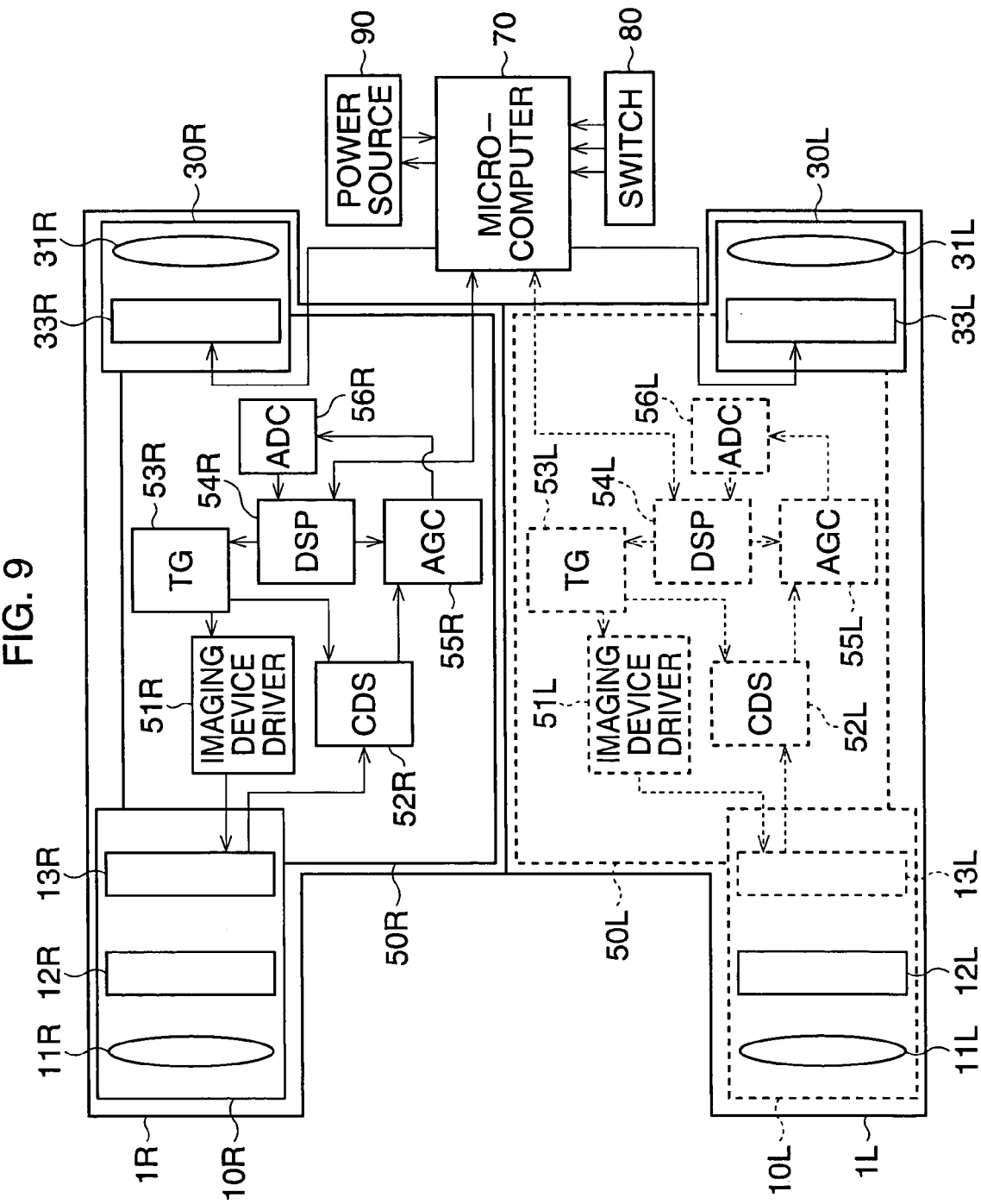
FIG. 9 is a block diagram of the electronic binoculars of the first embodiment, which schematically depicts the state of the first energy-saving mode.

When the switch 80 is switched from the normal mode or the ON mode to the first energy-saving mode by operating the operational member 80a, such that when the first energy-saving mode is selected (see FIG. 5), a first energy-saving contact of the switch 80 is connected to be in the ON state while maintaining the normal mode contact in the ON state. The controller 70 detects this contact state, and in turn verifies the selected mode as the first energy-saving mode (see FIG. 7). In this first energy-saving mode, for example, the electricity is supplied to all of the components in the right binocular unit 1R and the controller 70, while the electricity is not supplied to the components in the left binocular unit 1L, except for the left ocular unit 30L. FIG. 9 schematically illustrates this state. Namely, the units or components being supplied with the electricity are depicted by the solid lines and those not being supplied with the electricity are depicted by the phantom lines. The right image-signal processing unit 50R converts the electric signals from the right imaging unit 10R to the image signals. The controller 70 transmits the image signals converted by the right image-signal processing unit 50R to both of the right and left ocular units 30R and 30L. In the first energy-saving mode, although the image capturing operations and the image-signal processing operations are not carried out in the left binocular unit 1L, in order to reduce the energy consumption, the image captured by the right imaging device 33R is not only displayed on the right image-indicating device 33R, but also displayed on the left image-indicating device 33L, so that binocular vision is still available. Thereby, even when the first energy-saving mode is selected, the observer is free from the blind-in-one-eye feeling and in turn, eyestrain from the observation is reduced.

Figure 10:
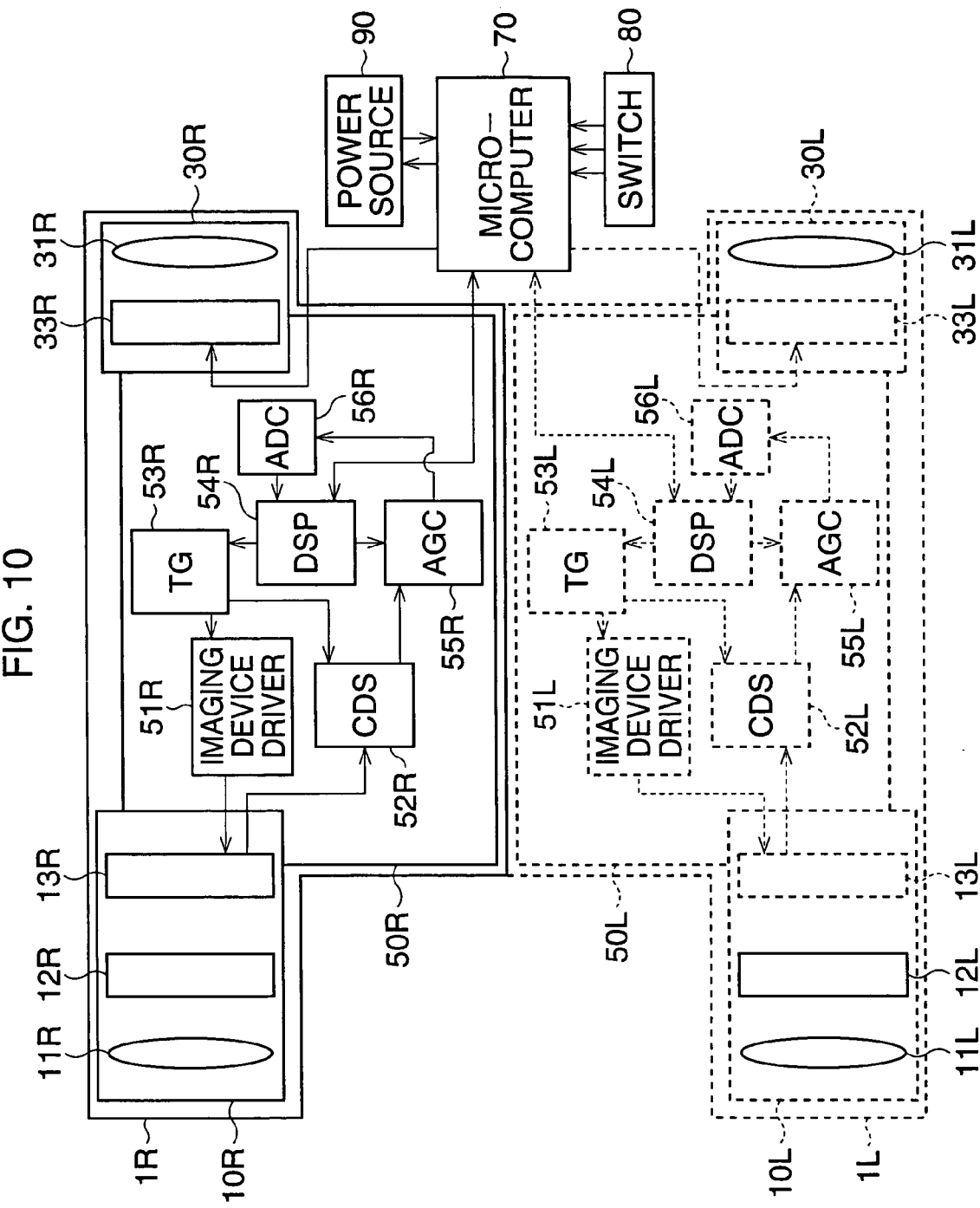
FIG. 10 is a block diagram of the electronic binoculars of the first embodiment, which schematically depicts the state of the second energy-saving mode.
Figure 11:
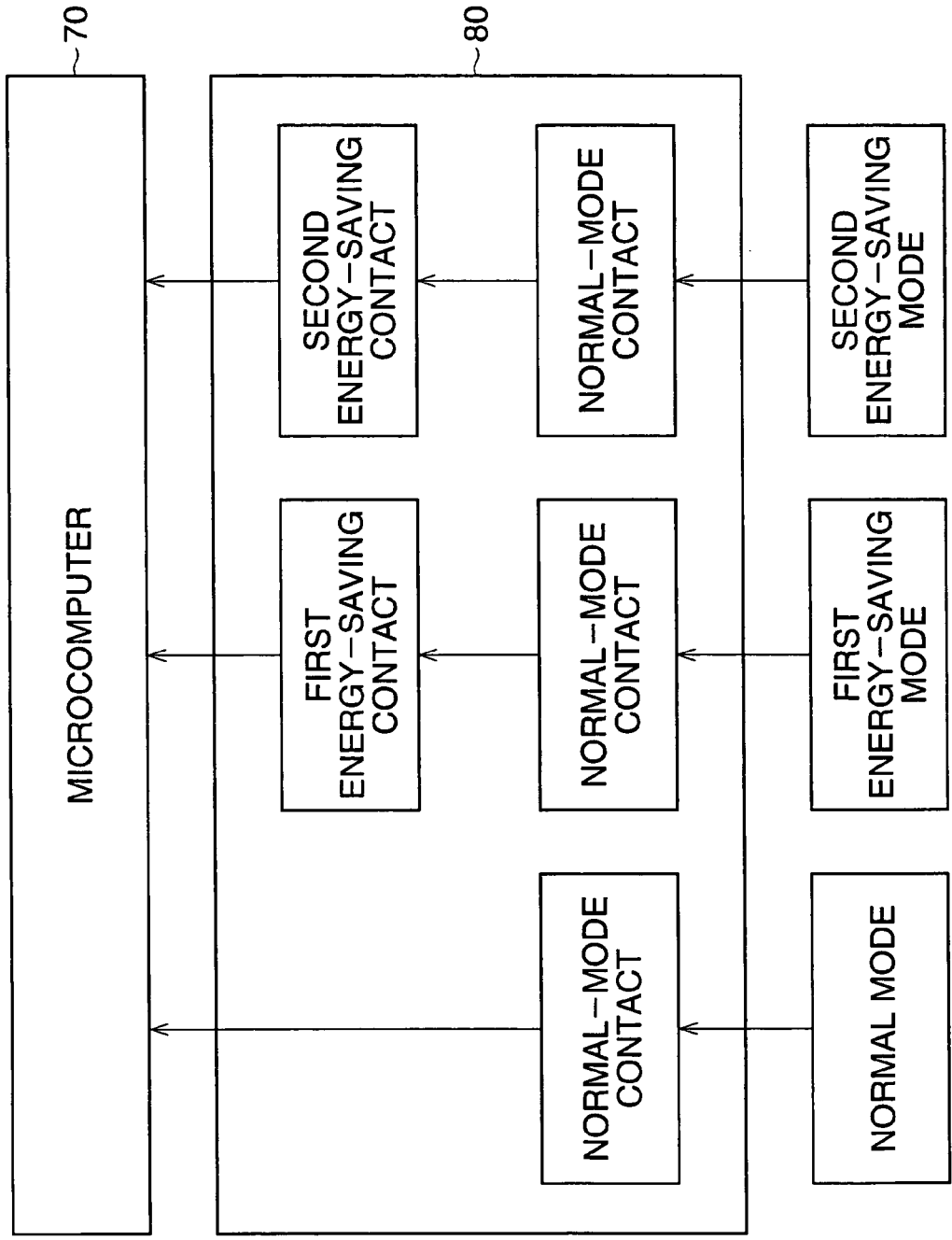
FIG. 11 is a diagram of switch contacts verified by a controller to define the mode selection of the switch in the second embodiment.

When the switch 80 is switched from the first energy-saving mode to the second energy-saving mode by operating the operational member 80a (see FIG. 6), a second energy-saving contact of the switch 80 is then connected to be in the ON state while maintaining the normal mode contact in the ON state. The controller 70 detects this contact state, and in turn determines the selected mode as the second energy-saving mode (see FIG. 7). In this second energy-saving mode, the electricity is supplied to the components in the right binocular unit 1R and the controller 70, while electricity is not supplied to any of the components in the left binocular unit 1L. FIG. 10 schematically illustrates this state. Namely, the units or components being supplied with the electricity are depicted by the solid lines and those not being supplied with electricity are depicted by the phantom lines. The right image-signal processing unit 50R converts only the electric signals from the right imaging unit 10R to the image signals. Further, the controller 70 transmits the image signals converted by the right image-signal processing unit 50R only to the right ocular unit 30R.

Consequently, according to the first embodiment, the electricity consumption can be reduced compared to that in the normal mode, where the electricity is supplied to both of the imaging units 10R and 10L, both of the ocular units 30R and 30L, and both of the image-signal processing units 50R and 50L, since the electricity supply for the left imaging unit 10L, the left ocular unit 30L, and the left image-signal processing unit 50L, as well as the image signals transmitted to the ocular unit 30L, can be controlled by the mode selection of a user.

Further, in the second energy saving mode, the supply of electricity to the left image-indicating device 33L is also prohibited, so that electricity consumption in the second energy saving mode is reduced compared to the first energy saving mode.

Next, the second embodiment of the present invention will be explained. As shown in FIGS. 11 to 14, the difference in structure to the first embodiment is that the electronic binoculars of the second embodiment include only a single image-signal processing unit 50. Therefore, in the second embodiment, the electric signals obtained by the right and left imaging units 10R and 10L are converted to the image signals, which can be displayed in the right and left ocular units 30R and 30L, in the single image-signal processing unit 50. Namely, the electronic binoculars of the second embodiment include the right and left binocular units 2R and 2L, the image-signal processing unit 50, the controller 70, and the switch 80. Further, only the constructions dissimilar to those in the first embodiment will be explained in the following.

The constructions of the image-signal processing unit 50 are identical to those in the first embodiment. However, the second embodiment is dissimilar to the first embodiment in respect of the electric signals obtained by both of the imaging units 10R and 10L. There signals are converted to image signals that can be displayed in the respective right and left ocular units 30R and 30L, in the single image-signal processing unit 50, while conversion of the right and left electric signals, in the first embodiment, is respectively carried out separately in the right and left image-signal processing units 50R and 50L.

The construction of the controller 70 is identical to that in the first embodiment. However, unlike the first embodiment in which image signals, converted by each of the right and left image-signal processing units 50R and 50L, are fed to the respective right and left ocular units 30R and 30L, the controller 70 of the second embodiment feeds right and left image signals converted by the single image-signal processing unit 50 to the respective right and left ocular units 30R and 30L.

Further, the controller 70 controls the electricity supply for the left imaging unit 10L and the left ocular unit 30L, and the signal-image supply for the left ocular unit 30L, in accordance with the state of the switch contacts of the switch 80.

Figure 12:
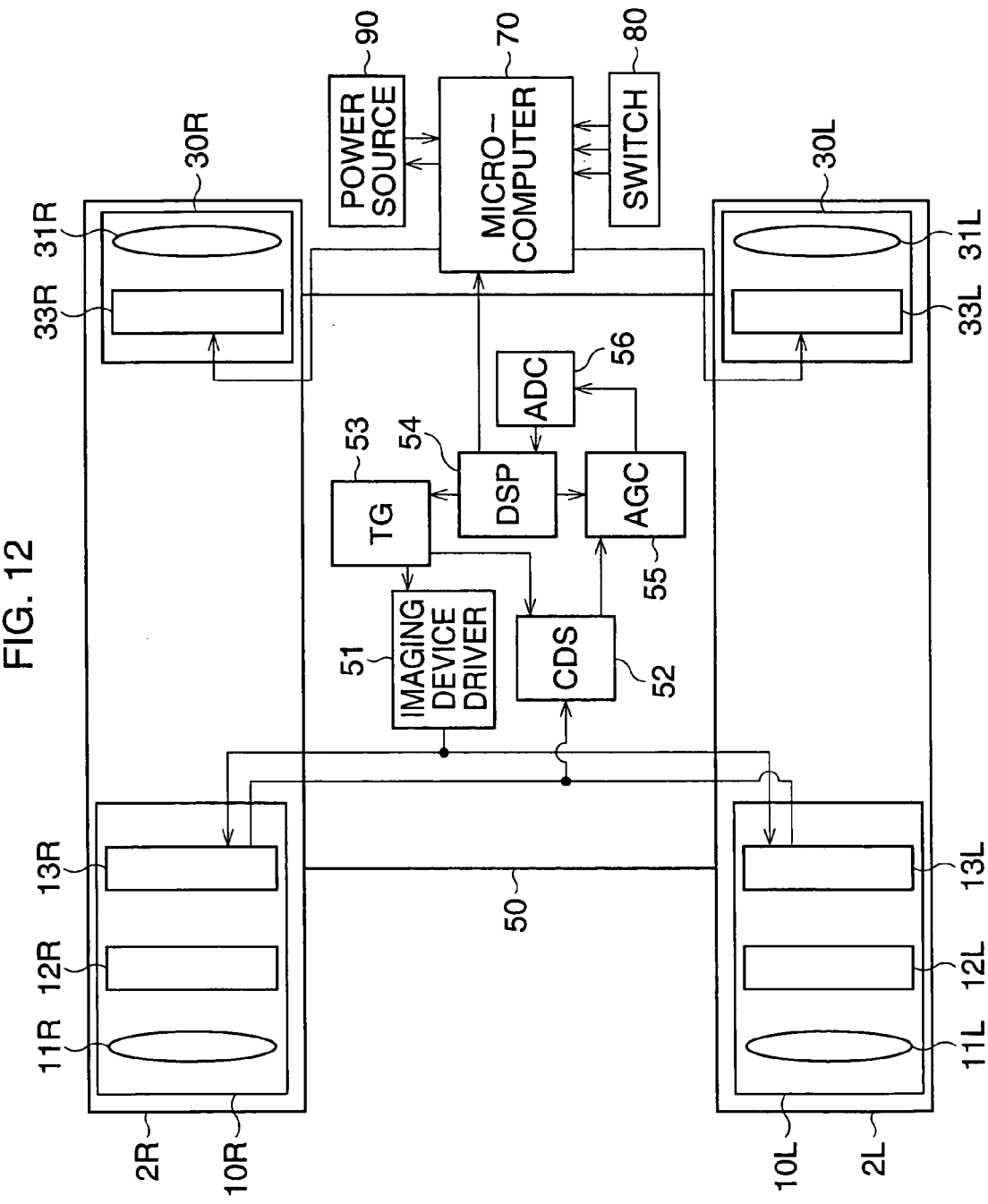
FIG. 12 is a block diagram of the electronic binoculars of the second embodiment, which schematically depicts the state of the normal mode.

The construction of the switch 80 is identical to that in the first embodiment. When the user switches the operational member 80a from the power-off position to the normal mode position, the normal-mode contact of the switch 80 is connected to be in the ON state. The controller 70 detects this contact state and verifies that the normal mode is selected (see FIG. 11). When the normal mode is selected, the electricity is supplied to all of the units and components in the electronic binoculars, including the right and left imaging units 10R and 10L, the right and left ocular units 30R and 30L, the image-signal processing unit 50, and the controller 70. FIG. 12 schematically illustrates the state when the electricity is supplied to all of the components of the electronic binoculars, where solid lines depict all of the units or the components to which the electricity is supplied.

The operations which are carried out in each of the components, when the electricity is supplied thereto from the power source 90 by the controller 70, are similar to those in the first embodiment, other than the conversion of the electric signals obtained by the right and left imaging units 10R and 10L to the image signals, which is performed in the single image-signal processing unit 50.

Figure 13:
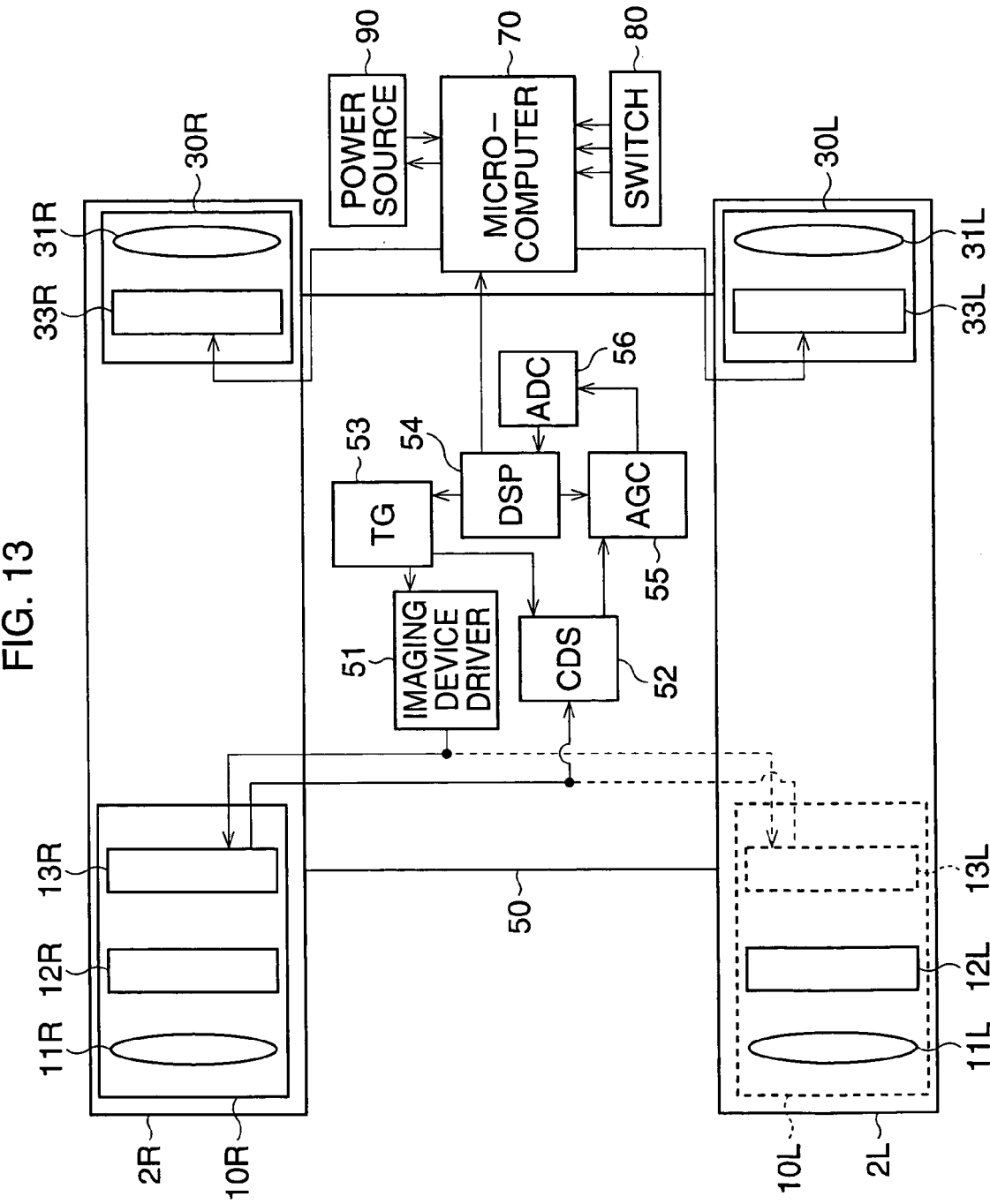
FIG. 13 is a block diagram of the electronic binoculars of the second embodiment, which schematically depicts the state of the first energy-saving mode.

When the switch 80 is switched from the normal mode or the ON mode to the first energy-saving mode by operating the operational member 80a, such that when the first energy-saving mode is selected, the first energy-saving contact of the switch 80 is connected to be in the ON state while maintaining the normal mode contact in the ON state. The controller 70 detects this contact state, and in turn determines the selected mode as the first energy-saving mode (see FIG. 11). In this first energy-saving mode, for example, the electricity is supplied to all of the components in the right binocular unit 2R and the controller 70, while electricity is not supplied to the left imaging unit 10L in the left binocular unit 2L. FIG. 13 schematically illustrates this state. Namely, the units or components being supplied with electricity are depicted by the solid lines and those not being supplied with electricity are depicted by the phantom lines. The image-signal processing unit 50 converts the electric signals from the right imaging unit 10R to image signals. The controller 70 transmits the image signals converted by the image-signal processing unit 50 to both the right and left ocular units 30R and 30L. In the first energy-saving mode, although the image capturing operations are not carried out in the left binocular unit 2L, in order to reduce the energy consumption, the image captured by the right imaging device 33R is not only displayed on the right image-indicating device 33R but also on the left image-indicating device 33L, so that binocular vision is still available. Thereby, even when the first energy-saving mode is selected, the observer is free from the blind-in-one-eye feeling and in turn eyestrain from the observation is reduced.

Figure 14:
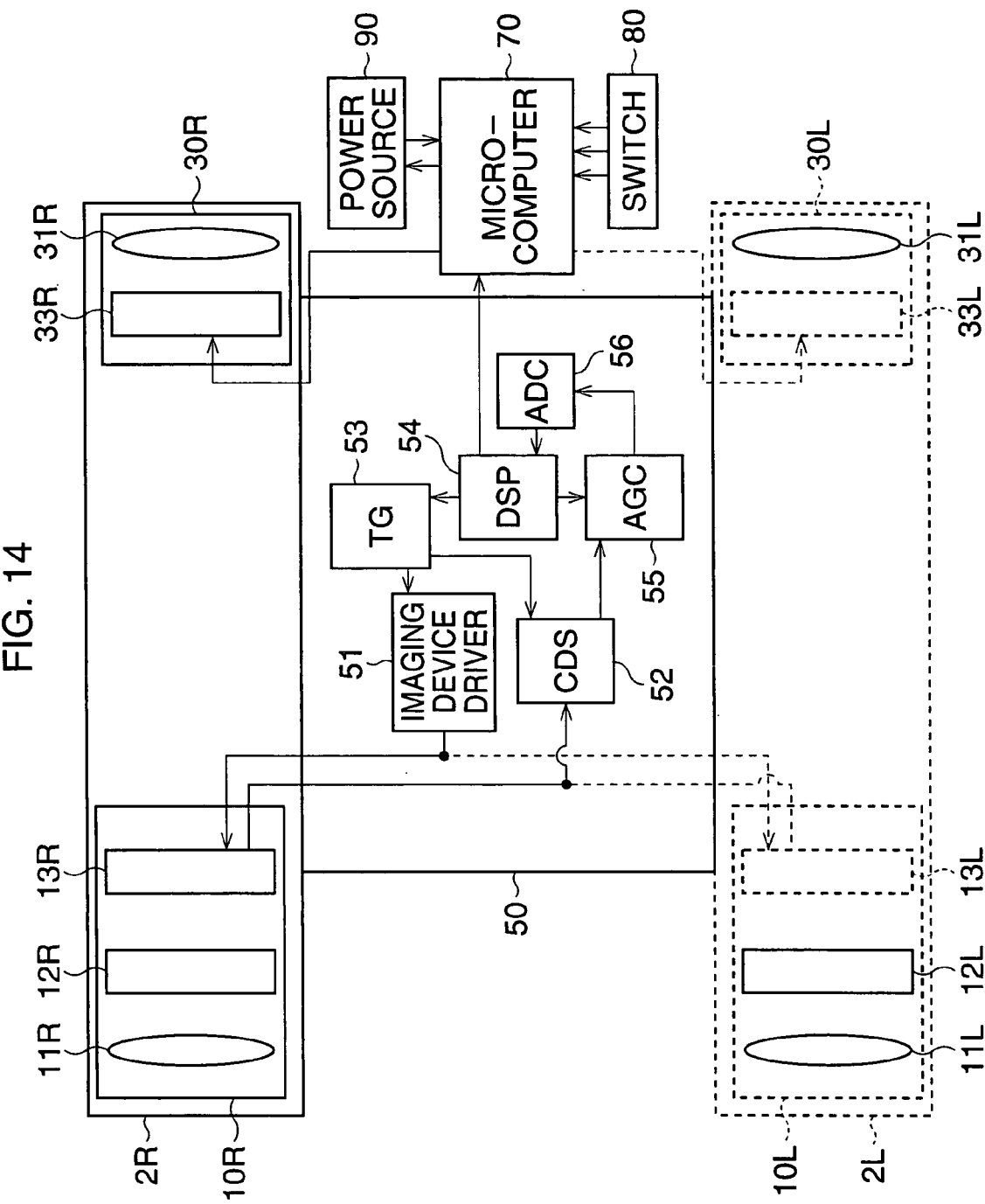
FIG. 14 is a block diagram of the electronic binoculars of the second embodiment, which schematically depicts the state of the second energy-saving mode.
Figure 15:
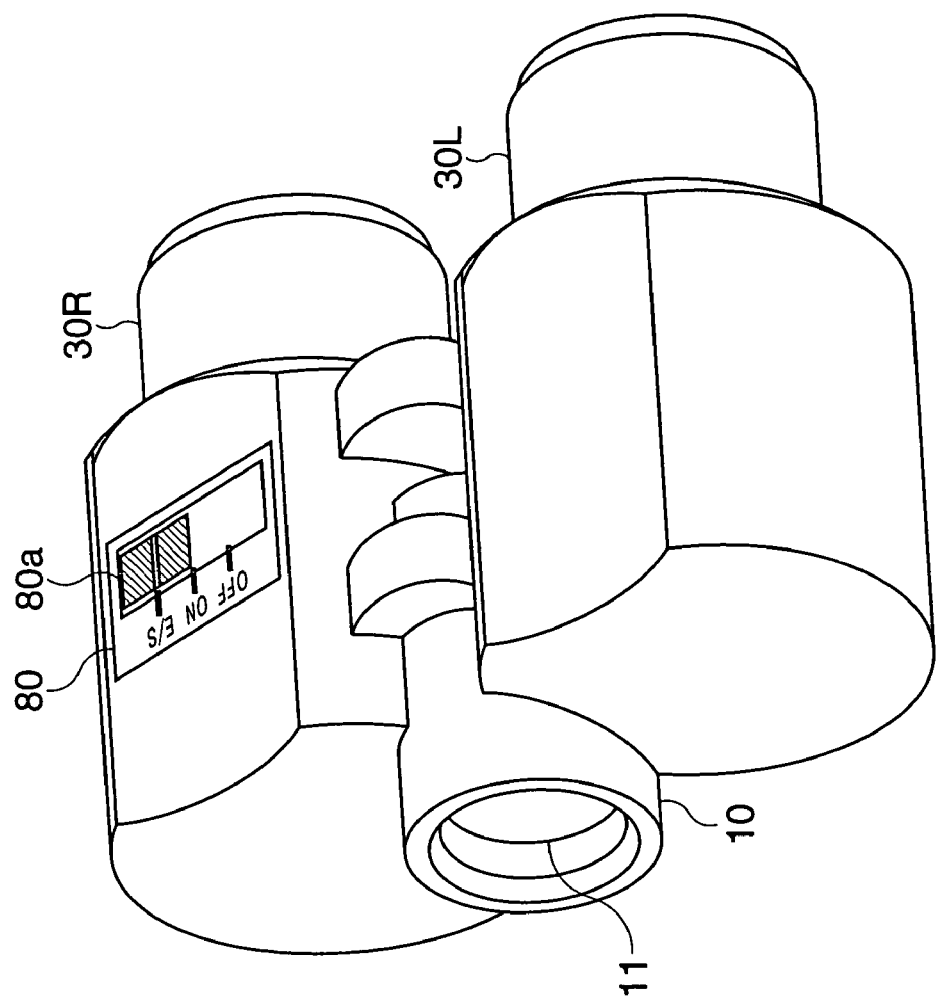
FIG. 15 is a perspective view of the electronic binoculars of the third embodiment viewed from the objective lens side.
Figure 16:
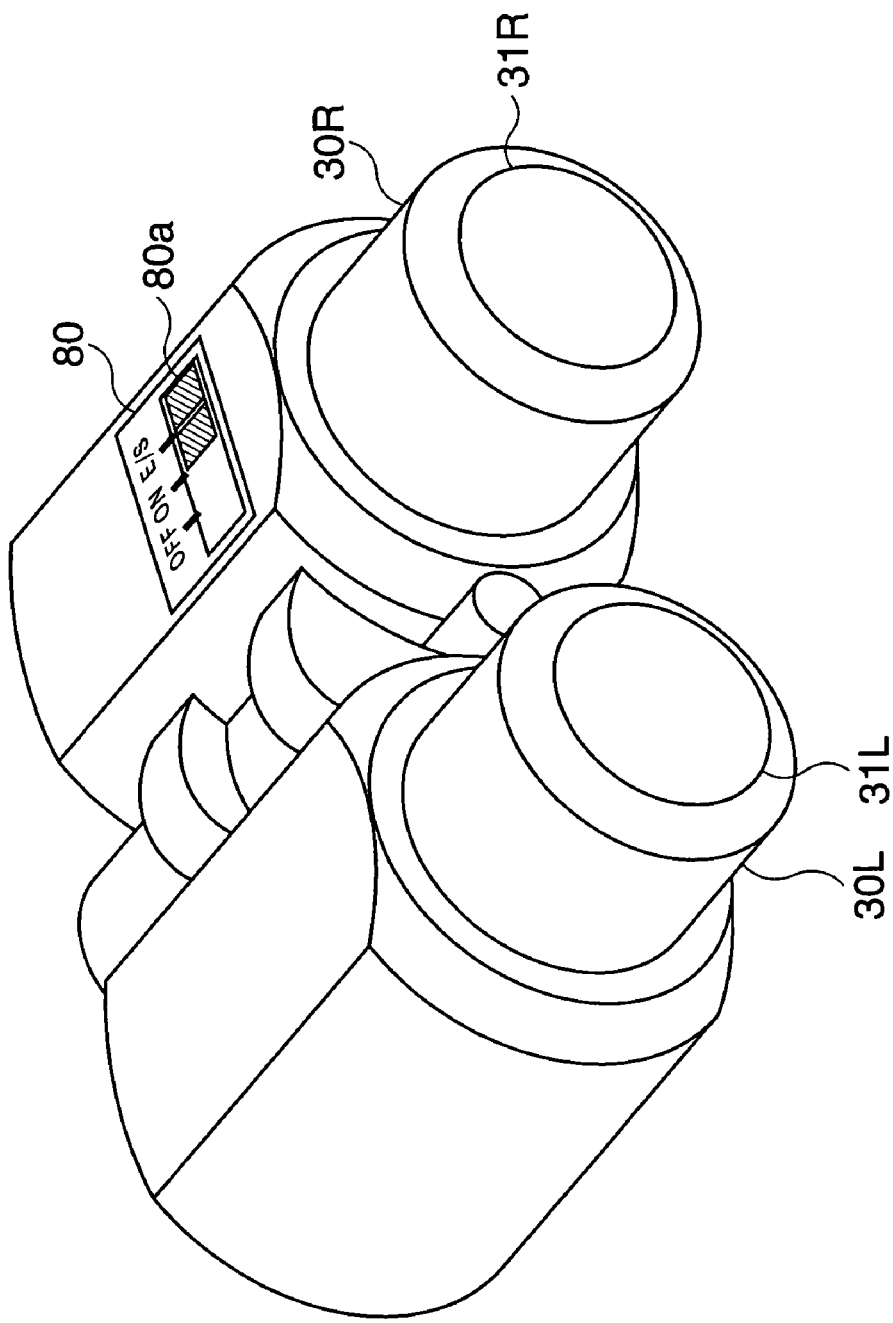
FIG. 16 is a perspective view of the electronic binoculars of the third embodiment viewed from the ocular lens side.
Figure 17:
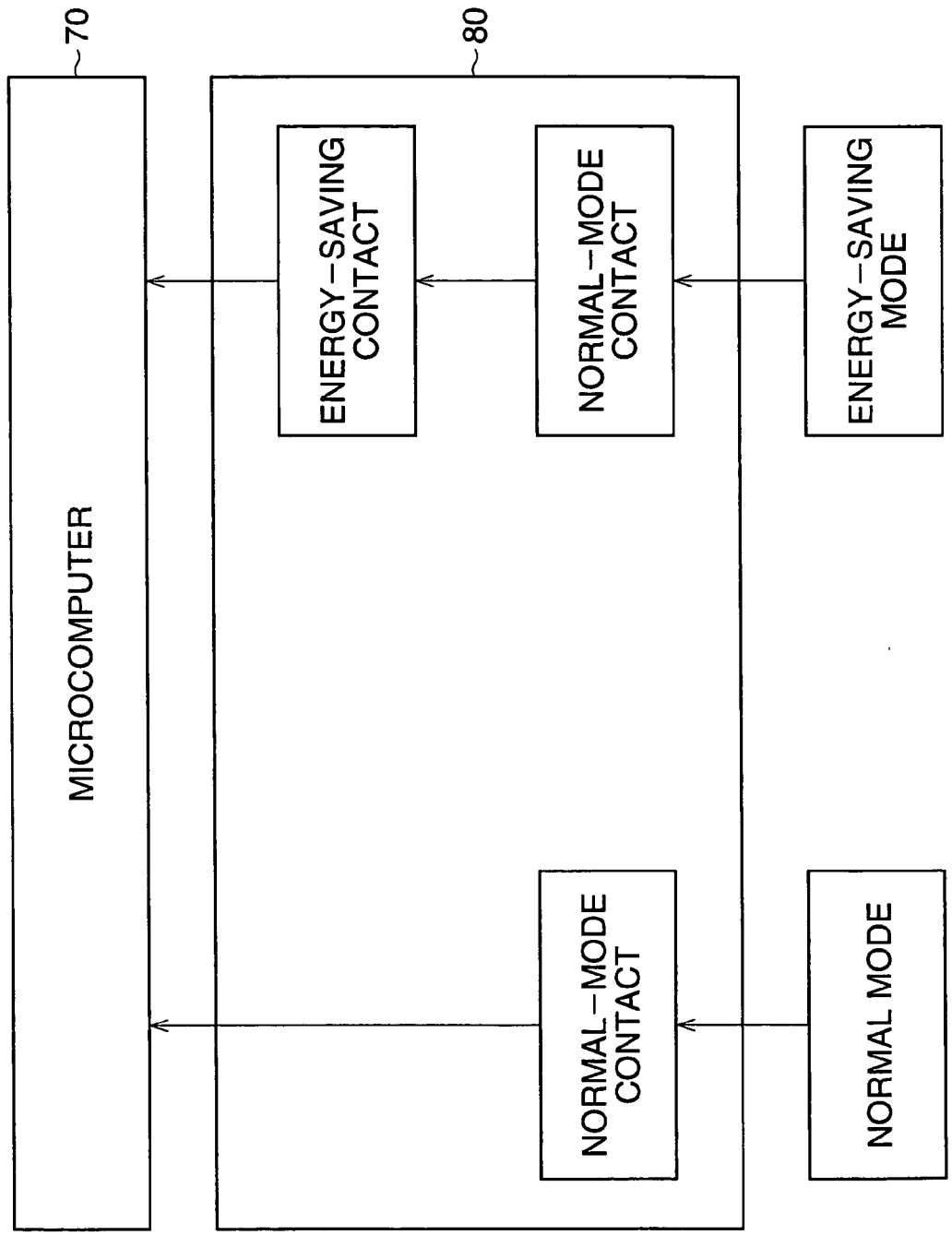
FIG. 17 is a diagram of switch contacts verified by a controller to define the mode selection of the switch in the third embodiment.

When the switch 80 is switched from the first energy-saving mode to the second energy-saving mode by operating the operational member 80a, the second energy-saving contact of the switch 80 is then connected to be in the ON state while maintaining the normal mode contact in the ON state. The controller 70 detects this contact state, and in turn determines the selected mode as the second energy-saving mode (see FIG. 11). In this second energy-saving mode, the electricity is supplied to all of the components in the right binocular unit 2R and the controller 70, while electricity is not supplied to any of the components in the left binocular unit 2L. FIG. 14 schematically illustrates this state. Namely, the units or components being supplied with electricity are depicted by the solid lines and those not being supplied with electricity are depicted by the phantom lines. The image-signal processing unit 50 converts only the electric signals from the right imaging unit 10R to image signals. Further, the controller 70 transmits the image signals converted by the right image-signal processing unit 50R only to the right ocular unit 30R.

Consequently, according to the second embodiment, the amount of electricity consumption can be reduced compared to the normal mode, where the electricity is supplied to both the imaging units 10R and 10L, both the ocular units 30R and 30L, and the image-signal processing unit 50, since the electricity supply for the left imaging unit 10L and the left ocular unit 30L, as well as the transmission of the image signals to the left ocular unit 30L, are controllable by the mode selection of a user.

Next, the third embodiment of the present invention will be explained. As shown in FIGS. 15 to 19, the difference in structure to the first embodiment is that the electronic binoculars of the third embodiment includes only a single imaging unit 10 and a single image-signal processing unit 50. Therefore, in the third embodiment, the electric signals obtained by the single imaging unit 10 are converted to image signals, which can be displayed in the right and left ocular units 30R and 30L, in the single image-signal processing unit 50. Further, only the constructions dissimilar to those in the first embodiment will be explained in the following.

The construction of the image-signal processing unit 50 is identical to that in the first embodiment. However, the third embodiment is dissimilar to the first embodiment with respect to the electric signals obtained by the imaging units 10, which are converted to the image signals that can be displayed in the respective right and left ocular units 30R and 30L, in the single image-signal processing unit 50, while conversion of the right and left electric signals, in the first embodiment, is carried out separately in the right and left image-signal processing units 50R and 50L, respectively.

The construction of the controller 70 is identical to that in the first embodiment. However, unlike to the first embodiment that feeds image signals converted by each of the right and left image-signal processing units 50R and 50L to the respective right and left ocular units 30R and 30L, the controller 70 of the third embodiment feeds image signals converted by the single image-signal processing unit 50 to both the right and left ocular units 30R and 30L.

Further, the controller 70 controls the electricity supply for the left ocular unit 30L in accordance with the state of the switch contacts of the switch 80.

Figure 3:
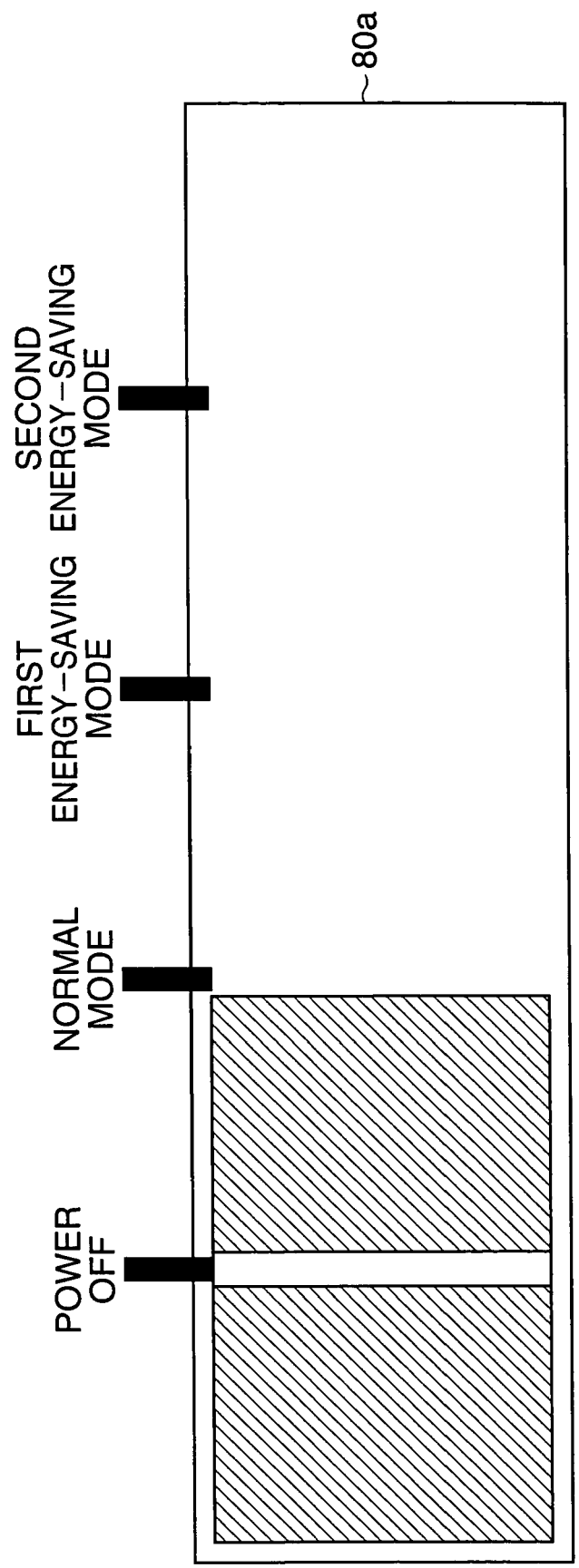
FIG. 3 is a top plan view of a slidable operational member of a switch when it is positioned at a power-off position.
Figure 4:
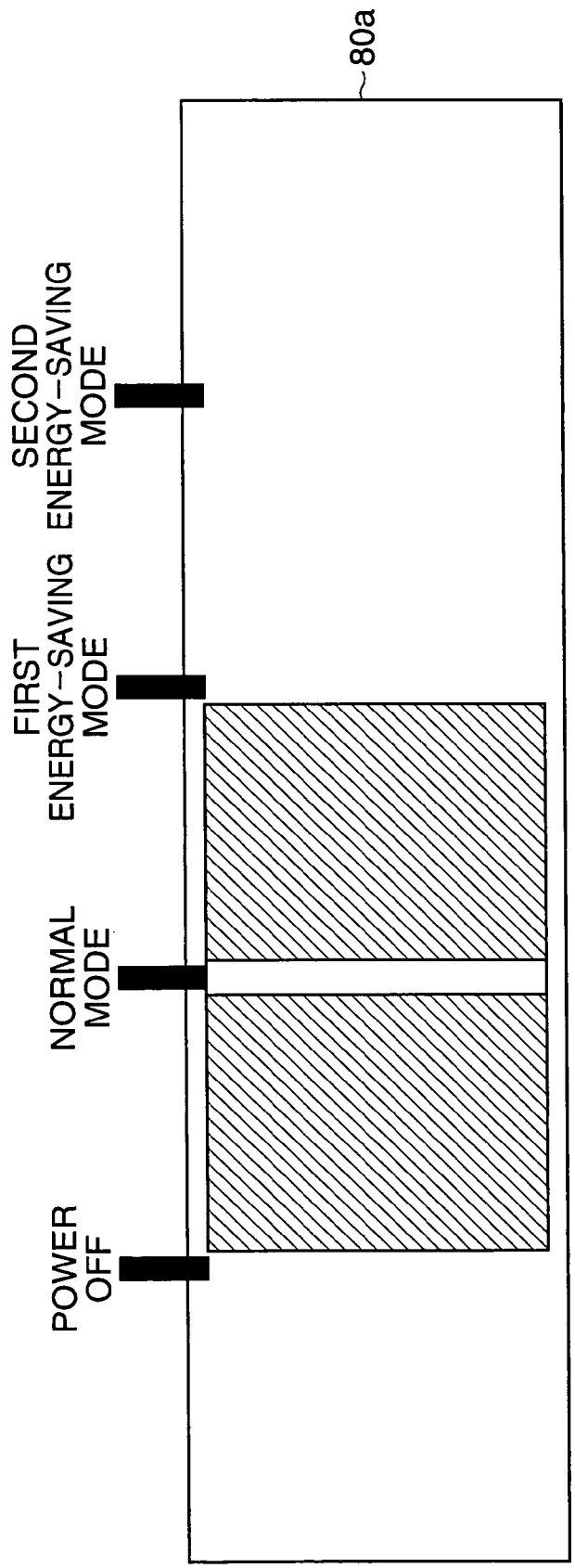
FIG. 4 is a top plan view of the slidable operational member of the switch when it is positioned at a normal mode position.
Figure 5:
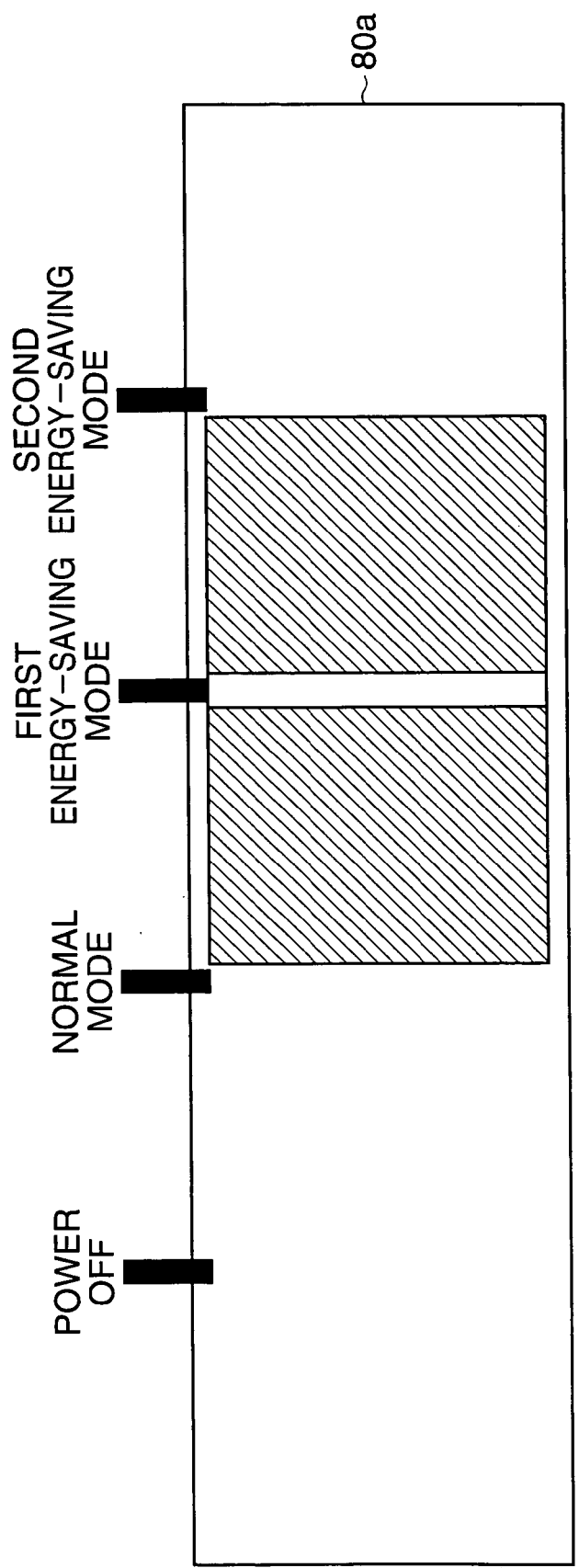
FIG. 5 is a top plan view of the slidable operational member of the switch when it is positioned at a first energy-saving mode position.
Figure 6:
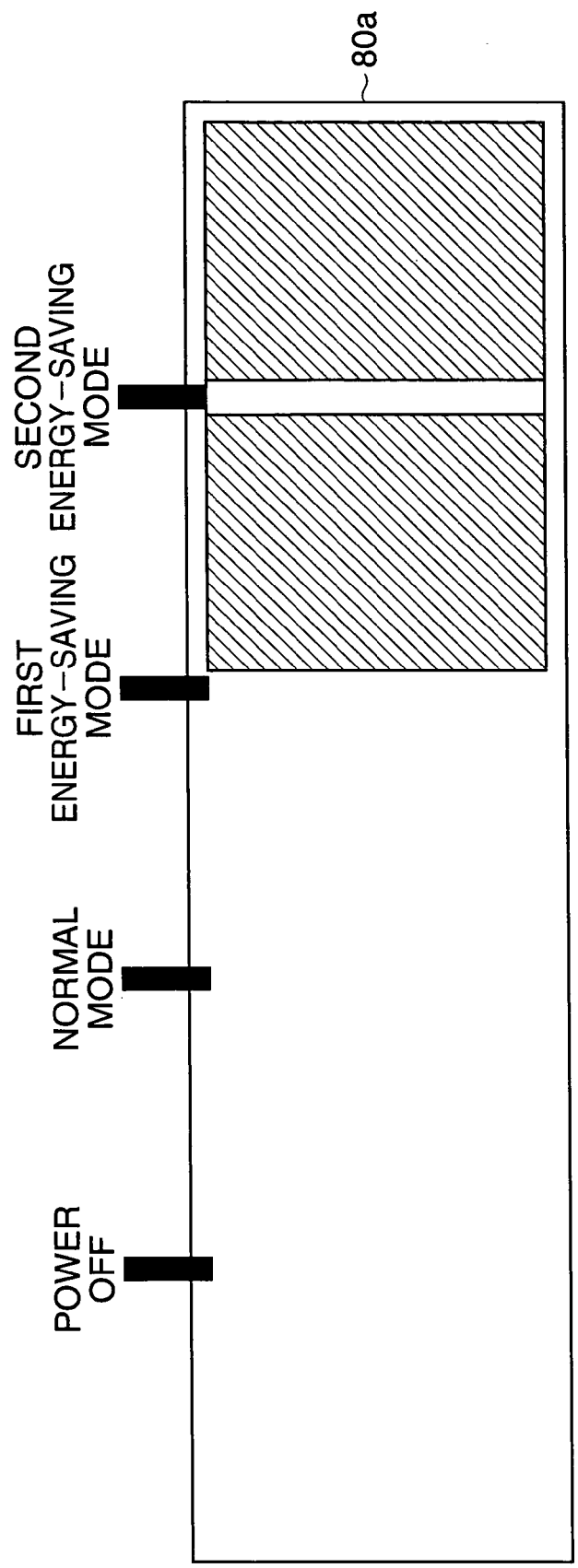
FIG. 6 is a top plan view of the slidable operational member of the switch when it is positioned at a second energy-saving mode position.
Figure 7:
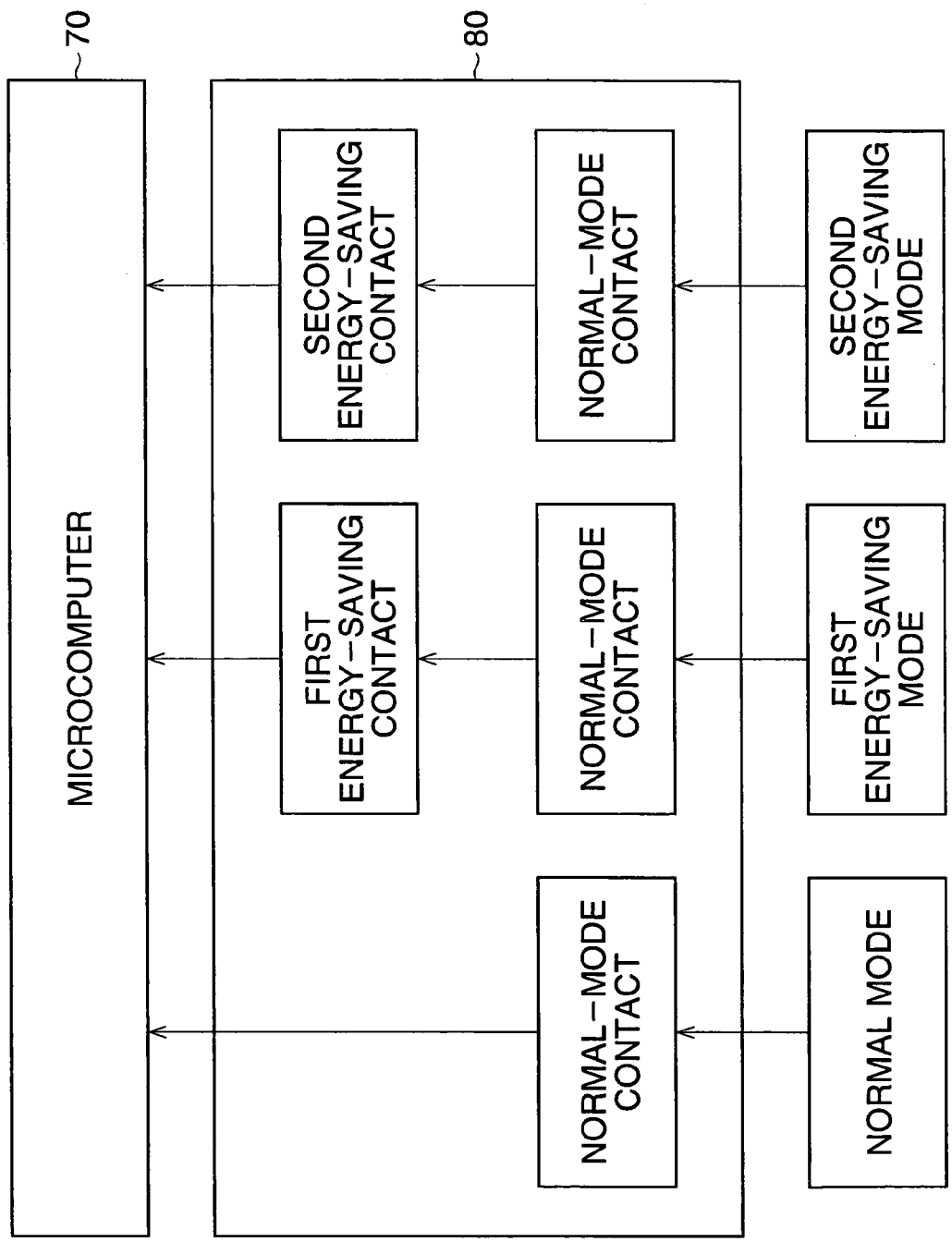
FIG. 7 is a diagram of switch contacts verified by a controller to define the mode selection of the switch in the first embodiment.
Figure 18:
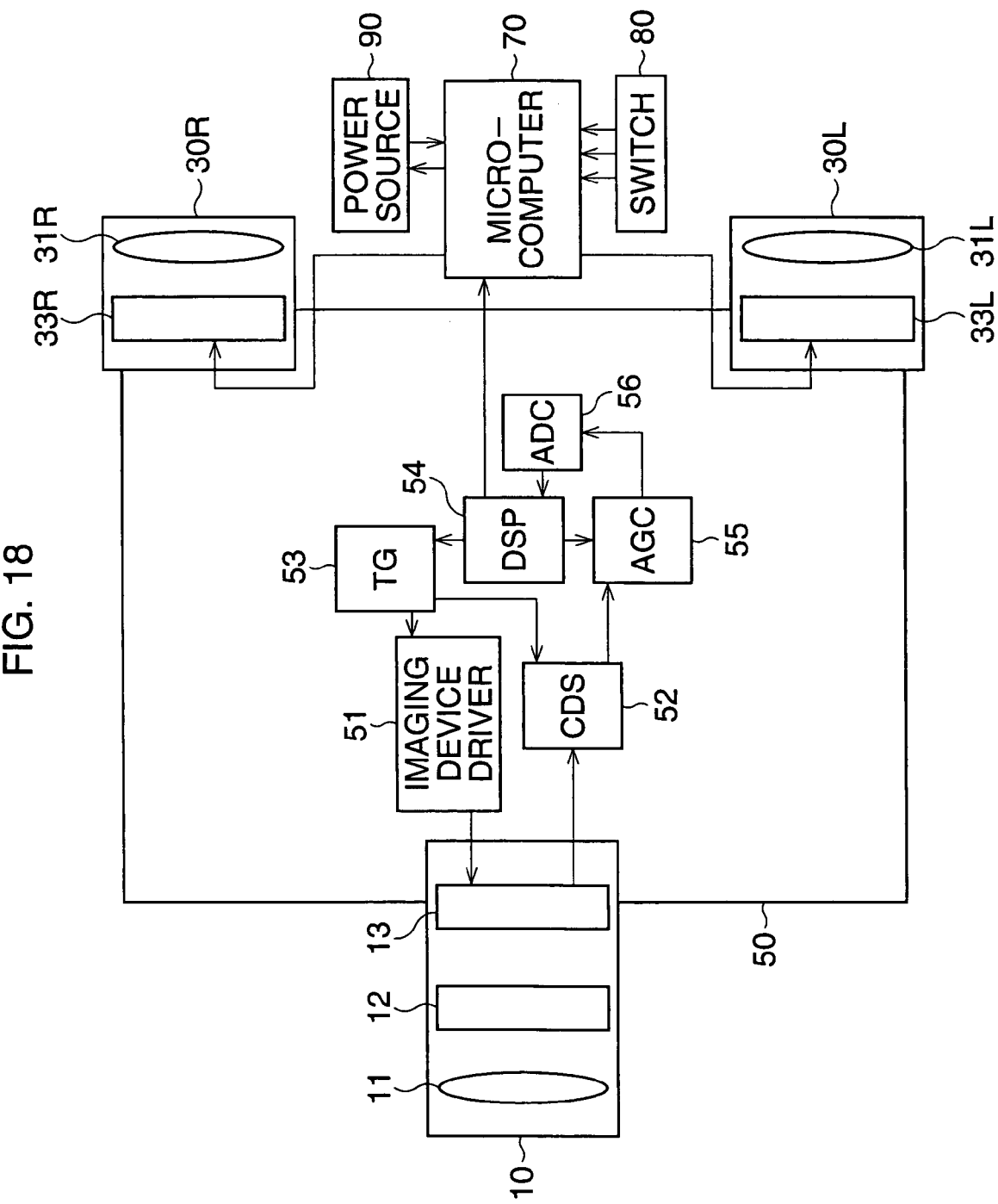
FIG. 18 is a block diagram of the electronic binoculars of the third embodiment, which schematically depicts the state of the normal mode.

The switch 80 in the first embodiment is a switch having four selective modes, such as the power-off mode, normal (ON) mode, the first energy-saving mode, and second energy-saving mode, as shown in FIG. 3. On the other hand, the switch 80 in the third embodiment has only three selective modes; the power-off mode, normal (ON) mode, and an energy-saving mode. Note that, in FIGS. 15 and 16, the normal mode and the energy-saving mode are represented by "ON" and "E/S", respectively. When the user slides or operates the operational member 80a from the power-off position to the position corresponding to the normal mode, that is, turning on the power and selecting the normal mode, a normal-mode contact of the switch 80 that designates the electricity to be supplied to all the components, connected to be in the ON state while other contacts are not connected and remain in the OFF state. Thereby, the controller 70 detects this ON state and verifies the selection of the normal mode (see FIG. 17). In this case, the electricity is supplied to all components of the electronic binoculars, that is, to the imaging unit 10, both the right and left ocular units 30R and 30L, the image-signal processing unit 50, and the controller 70. FIG. 18 schematically illustrates the state when the electricity is supplied to all of the components of the electronic binoculars, where solid lines depict all of the components to which the electricity is supplied.

The operations which are carried out in each of the components, when the electricity is supplied thereto from the power source 90 by the controller 70, are similar to those in the first embodiment, except that the electric signals are obtained by the single imaging unit 10, and the conversion of the electric signals to the image signals is carried out in the single image-signal processing unit 50.

Figure 19:
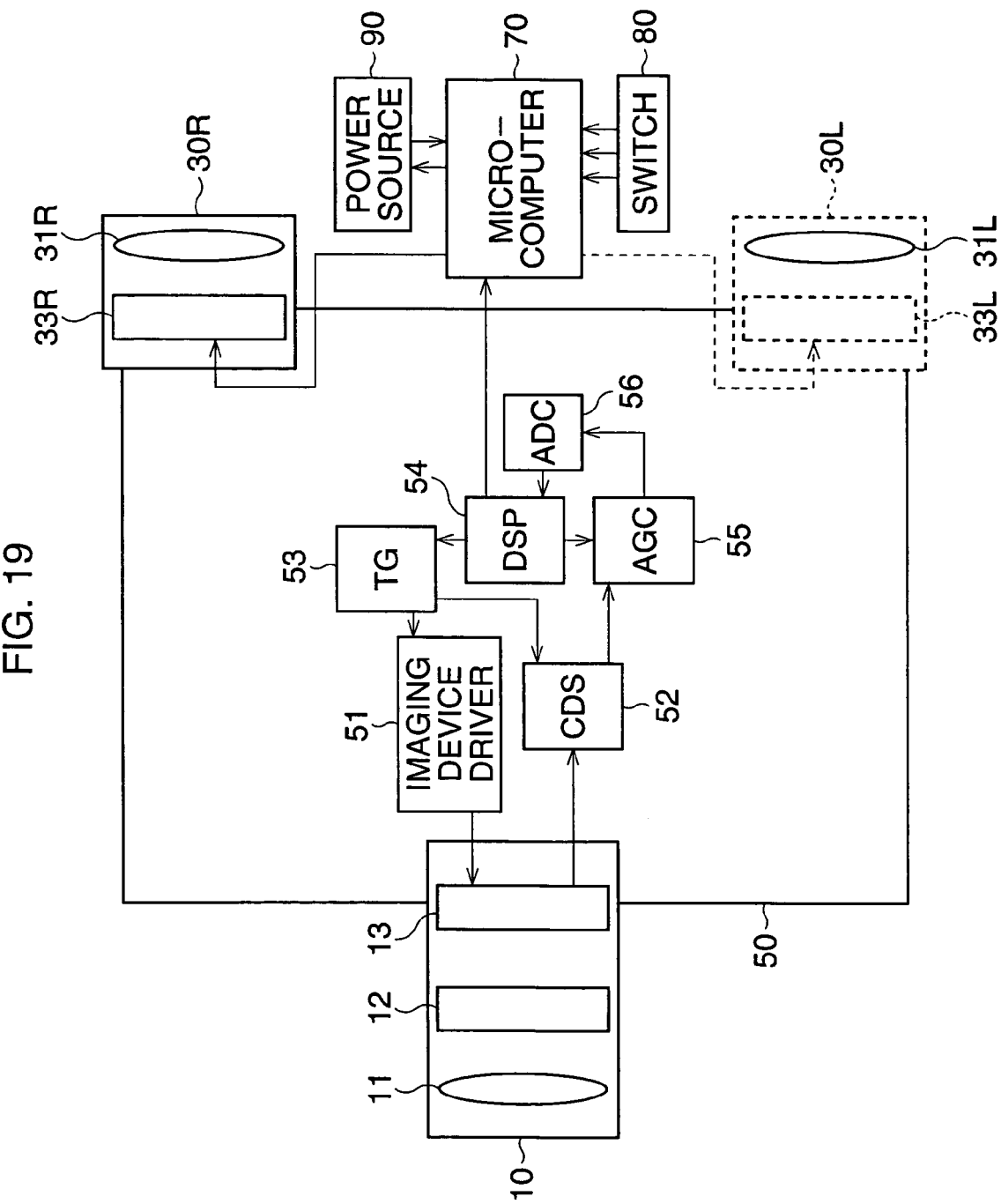
FIG. 19 is a block diagram of the electronic binoculars of the third embodiment, which schematically depicts the state of the energy-saving mode.

When the switch 80 is switched form the normal mode or the ON mode to the energy-saving mode by operating the operational member 80a, such that when the energy-saving mode is selected, the energy-saving contact of the switch 80 is made ON state while maintaining the normal mode contact in the ON state. The controller 70 detects this contact state, and in turn verifies the selected mode as the energy-saving mode (see FIG. 17). In this energy-saving mode, the electricity is supplied to the imaging unit 10, the right ocular unit 30R, the image-signal processing unit 50, and the controller 70, as well as other components of the electronic binoculars, while electricity is not supplied to the left ocular unit 30L. FIG. 19 schematically illustrates this state. Namely, the units or components being supplied with electricity are depicted by the solid lines and those not being supplied with the electricity are depicted by the phantom lines. The image-signal processing unit 50 converts the electric signals from the imaging unit 10 to image signals.

The controller 70 transmits the image signals converted by the image-signal processing unit 50 to the right ocular unit 30R.

Consequently, according to the third embodiment, the electricity consumption can be reduced compared to the normal mode, where electricity is supplied to the imaging unit 10, both of the right and left ocular units 30R and 30L, and the image-signal processing unit 50, since the electricity supplied to the left ocular unit 30L, as well as the transmission of the image signals to the left ocular unit 30L, are controllable by the mode selection of the user.

In the above-described embodiments, electricity consumption was reduced by suspending the electricity supply to the components in the left binocular unit while supplying the electricity to the components in the right binocular unit. However, the consumption may be reduced by suspending the electricity supply to the component in the right binocular unit while supplying electricity to the components in the left binocular unit.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2003-161741 (filed on Jun. 6, 2003), which is expressly incorporated herein, by reference, in its entirety.

The invention claimed is:

1. Electronic binoculars, comprising:
   an electric power source;
   a first imaging unit that comprises a first imaging device that converts a first optical image of an object, obtained by a first objective optical system, to first electric signals;
   a second imaging unit that comprises a second imaging device that converts a second optical image of said object, obtained by a second objective optical system, to second electric signals;
   an image-signal processing unit that generates first and second image signals from said respective first and second electric signals;
   a first ocular unit that comprises a first image-indicating device that indicates the object image based on said first image signals,
   a second ocular unit that comprises a second image-indicating device that indicates the object image based on said second image signals; and
   a controller that controls said electric power source, said first and second imaging units, said first and second ocular units, and said image-signal processing unit;
   wherein said controller suspends the electricity supply from said electric power source to said second imaging unit while feeding said first image signals to said respective first and second image-indicating devices.

2. The binoculars according to claim 1, wherein said controller further suspends the electricity supply to said second ocular unit.

3. The binoculars according to claim 1, wherein said image-signal processing unit comprises a first image-signal processing unit that generates said first image signals from said first electric signals and a second image-signal processing unit that generates said second image signals from said second electric signals; and
   wherein said controller further suspends the electricity supply to said second image-signal processing unit.

4. The binoculars according to claim 1, further comprising an operational member that is manually operated, wherein said controller controls whether to supply or suspend the electricity to said second imaging unit in accordance with a state of said operational member.

5. Electronic binoculars, comprising:
   a first binocular unit comprising:
      a first imaging unit; and
      a first ocular unit through which an object captured by said first imaging unit is observed based on signals from said first imaging unit;
   a second binocular unit comprising:
      a second imaging unit; and
      a second ocular unit through which an object captured by said second imaging unit is observed based on signals from said second imaging unit; and
   a mode selector that selects at least one of first and second modes;
   wherein said first mode fully supplies electricity to each of said first and second binocular units and said second mode at least partially suspends the electricity supply to said second imaging unit while supplying electricity to said first imaging unit.

6. The binoculars according to claim 5, wherein said mode selector further comprises a third mode that is selectable and said third mode suspends the electricity supply to said second imaging unit and said second ocular unit.

7. The binoculars according to claim 5, wherein said imaging unit supplies the same object image to said first and second ocular units.

8. The binoculars according to claim 7, wherein said second mode suspends the electricity supply to said second ocular unit.

* * * * *